(12) United States Patent
Aparimarn et al.

(10) Patent No.: US 9,013,833 B2
(45) Date of Patent: Apr. 21, 2015

(54) NON-CIRCULAR FEATURE FOR BOSS TOWER ENGAGEMENT

(71) Applicant: Seagate Technology LLC, Cupertino, CA (US)

(72) Inventors: Prapan Aparimarn, Bangkok (TH); Surawut Onasakorn, Samutprakarn (TH); Joomponladej Bamrungwongtaree, Bangkok (TH)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/796,767

(22) Filed: Mar. 12, 2013

(65) Prior Publication Data
US 2014/0268425 A1 Sep. 18, 2014

(51) Int. Cl.
*G11B 5/48* (2006.01)

(52) U.S. Cl.
CPC .................................. *G11B 5/4813* (2013.01)

(58) Field of Classification Search
USPC ............. 360/244.5, 24.6, 244.6, 244.2, 245.2
See application file for complete search history.

(56) References Cited

U.S. PATENT DOCUMENTS

| | | | |
|---|---|---|---|
| 4,875,117 A * | 10/1989 | Slezak et al. ............... | 360/98.01 |
| 5,717,545 A | 2/1998 | Brooks, Jr. et al. | |
| 6,033,755 A | 3/2000 | Hanrahan et al. | |
| 6,128,164 A * | 10/2000 | Kant et al. ................. | 360/244.5 |
| 6,399,179 B1 | 6/2002 | Hanrahan et al. | |
| 6,757,136 B2 * | 6/2004 | Buske et al. ............... | 360/244.5 |
| 6,940,696 B2 * | 9/2005 | Takagi et al. .............. | 360/244.6 |
| 7,130,156 B1 * | 10/2006 | Fossum ...................... | 360/244.6 |
| 7,502,204 B2 | 3/2009 | White et al. | |
| 7,633,717 B1 * | 12/2009 | Fossum et al. ............. | 360/244.6 |
| 8,049,995 B1 | 11/2011 | Ee et al. | |
| 8,233,239 B1 | 7/2012 | Teo et al. | |
| 8,804,286 B1 * | 8/2014 | Aparimarn et al. ........ | 360/244.6 |
| 2002/0145830 A1 * | 10/2002 | Wang et al. ................ | 360/244.6 |
| 2005/0078407 A1 | 4/2005 | Diewanit et al. | |
| 2006/0044693 A1 * | 3/2006 | Shimozato ................. | 360/244.6 |
| 2006/0174472 A1 | 8/2006 | Zhang et al. | |

* cited by examiner

*Primary Examiner* — Jefferson Evans
(74) *Attorney, Agent, or Firm* — Kagan Binder, PLLC (57) ABSTRACT

A head stack assembly comprising an actuator arm having an aperture therein, a head suspension assembly comprising a load beam having a mounting region with a aperture therein, and a base plate adapted to attach the head suspension assembly to the actuator arm, with the base plate comprising a boss tower having an outside surface and a swaging hole. One of the actuator arm aperture, the boss tower outside surface or the swaging hole is non-circular to provide increased compression between the boss tower and the actuator arm aperture in the roll direction than in the pitch direction. Methods of making a boss tower are also provided.

8 Claims, 8 Drawing Sheets

NON-CIRCULAR FEATURE FOR BOSS TOWER ENGAGEMENT

BACKGROUND

Hard disk drive systems (HDDs) typically include one or more data storage disks. A transducing head carried by a slider is used to read from and write to a data track on a disc. The slider is carried by an arm assembly that includes an actuator arm and a suspension assembly.

A swaging process is a common material processing technique used to connect the suspension assembly to the actuator arm. The suspension assembly includes a boss tower configured to fit within an aperture in the actuator arm. When a swage ball is passed through the boss tower when fitted in the arm aperture, the boss tower expands contacting the aperture surface and creating a frictional engagement that connects the suspension assembly to the actuator arm.

SUMMARY

One particular embodiment of this disclosure is a head stack assembly comprising an actuator arm having an aperture therein, a head suspension assembly comprising a load beam having a mounting region with an aperture therein, and a base plate adapted to attach the head suspension assembly to the actuator arm, with the base plate comprising a boss tower having an outside surface and a swaging hole. One of the actuator arm aperture, the boss tower outside surface or the swaging hole is non-circular.

These and various other features and advantages will be apparent from a reading of the following detailed description.

BRIEF DESCRIPTION OF THE DRAWING

The invention may be more completely understood in consideration of the following detailed description of various embodiments of the invention in connection with the accompanying drawing, in which.

DETAILED DESCRIPTION

The present invention relates to disk drives. More particularly, the invention provides a head-gimbal assembly that is attached to an actuator arm by a swaging process. Merely by way of example, the invention is applied to hard disk apparatus, but it would be recognized that the invention has a much broader range of applicability.

The swaging process is a material processing technique used to connect various elements; for a hard disk apparatus, swaging is commonly used to form a head stack assembly. During the process, a boss tower is expanded to couple a load beam of a head gimbal assembly to an actuator arm or E-block. In accordance with the present disclosure, at least one of the head stack assembly engagement surfaces (i.e., the boss tower outer surface, the boss tower swage hole, or the actuator arm aperture) is non-circular. The non-circular engagement surface reduces distortion and bending of the actuator arm often experienced when swaging circular engagement surfaces, by producing unequal compression forces in the pitch and roll directions. The result is improved overall quality of the head stack assembly due to decreased distortion (e.g., bending up or down) of the actuator arm.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present invention. The following detailed description, therefore, is not to be taken in a limiting sense. While the present invention is not so limited, an appreciation of various aspects of the invention will be gained through a discussion of the examples provided below.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Figure 1:
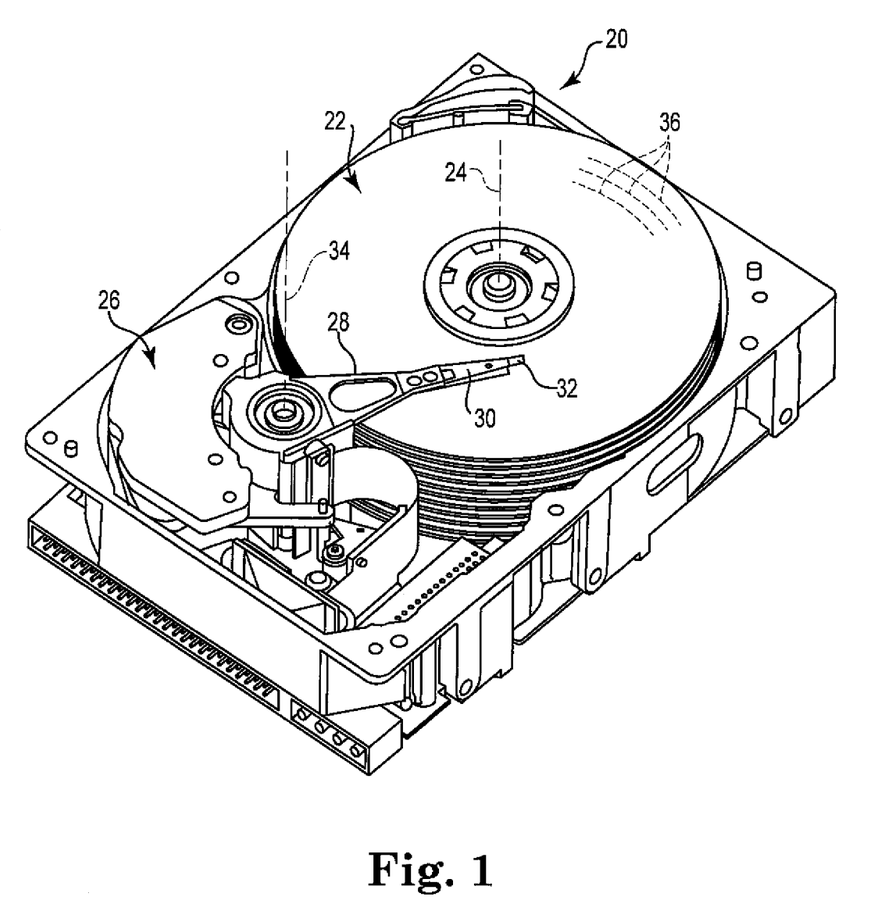
FIG. 1 is a perspective view of an exemplary hard disk drive (HDD) system.

FIG. 1 is a perspective view of an exemplary hard disk drive (HDD) system 20 that includes at least one magnetic storage disk 22 configured to rotate about an axis 24, an actuation motor 26 (e.g., a voice coil motor), an actuator arm 28, a suspension assembly 30 that includes a load beam, and a slider 32 carrying a transducing or read/write head (not shown). Slider 32 is supported by suspension assembly 30, which in turn is supported by actuator arm 28. Together, actuator arm 28, suspension assembly 30 and slider 32 form a head stack assembly (HSA). Actuation motor 26 is configured to pivot actuator arm 28 about an axis 34, in order to sweep suspension 30 and slider 32 in an arc across a surface of rotating disk 22 with slider 32 "sliding" or "flying" across disk 22 on a cushion of air, often referred to as an air bearing. The read/write head carried by slider 32 can be positioned relative to selected concentric data tracks 36 of disk 22 by a piezoelectric microactuator, not seen in FIG. 1. It should be noted that a stack of co-rotating disks 22 can be provided, with additional actuator arms 28, suspension assemblies 30, and sliders 32 carrying read/write heads for reading and writing at top and bottom surfaces of each disk 22 in the stack. A structure having multiple actuator arms 28, suspension assemblies 30 and slider 32 is often referred to as an E-block.

The present disclosure provides an attachment system for producing the head stack assembly (HSA) of HDD system 20; that is, the present disclosure provides a system for attaching together the various elements that form the HSA.

Figure 2:
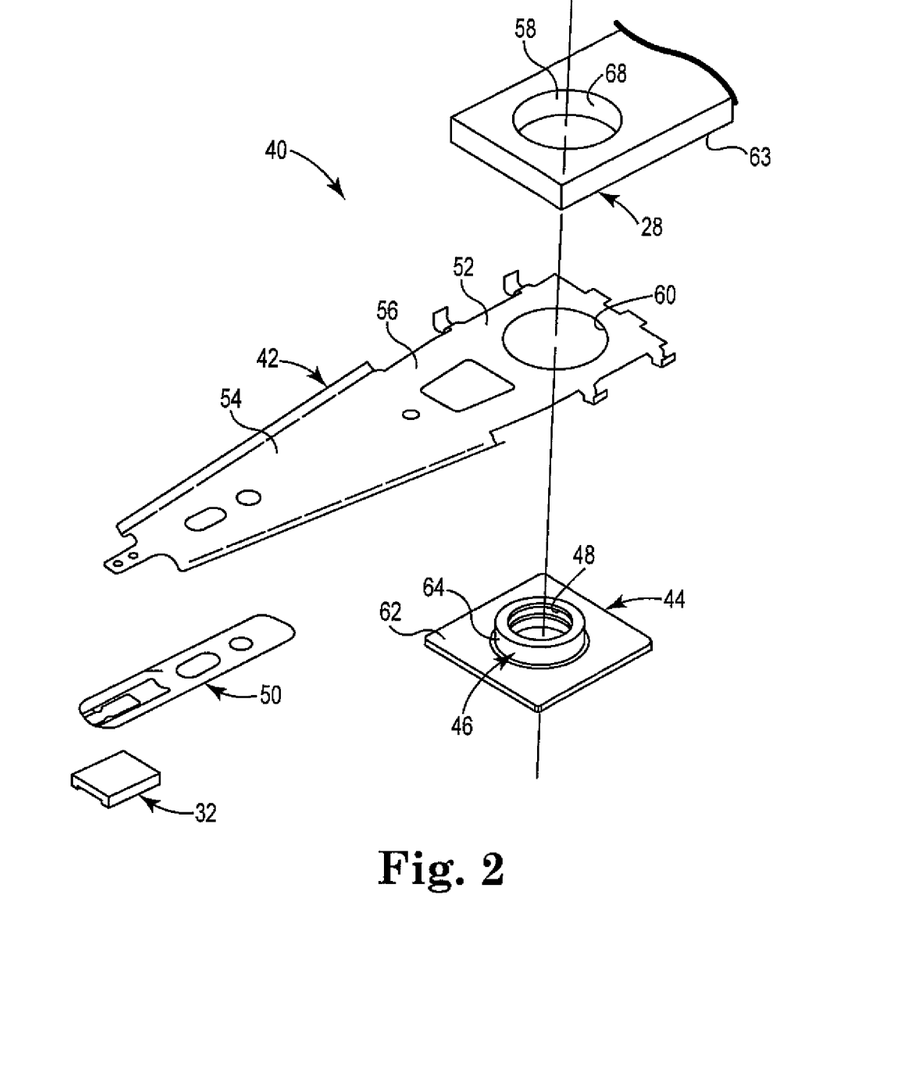
FIG. 2 is a perspective view of an exploded head stack assembly.

FIG. 2 is an exploded, isometric view of a head stack assembly (HSA) 40 including a load beam 42, actuator arm 28 and a base plate 44 with a boss tower 46. In the illustrated embodiment, HSA 40 includes a flexure 50 to which slider 32 carrying a transducing or read/write head is to be mounted; flexure 50 may be attached to load beam 42 by any conventional mechanism or may be integral with load beam 42. In some embodiments, together load beam 42, flexure 50 and slider 32 are referred to as a head suspension assembly. Flexure 50 allows pitch and roll motion of slider 32 and the read/write head as they move over the data tracks 36 of disk 22 (FIG. 1).

Load beam 42 includes a mounting region 52 at a proximal end, a rigid region 54 adjacent to a distal end and a spring region 56 between the mounting region 52 and rigid region 54. An aperture 60 is present in mounting region 52. Spring region 56 is relatively resilient and provides a downward bias force at the distal tip of load beam 42 for holding the slider 32 with read/write head near a spinning disk in opposition to an upward force created by the air bearing over the disc. HSA 40 is typically coupled to actuation motor 26 (FIG. 1) via actuator arm 28 that is attached to mounting region 52 of load beam 42.

A swage-type attachment is used to couple load beam 42 (at mounting region 52) to actuator arm 28. Aperture 58 of actuator arm 28 and aperture 60 of load beam 42 are shaped and sized to receive boss tower 46 of base plate 44 therethrough. Boss tower 46 has an outer surface 64 and a swaging aperture or hole 48 that passes through boss tower 46 and base plate 44. In some embodiments, the entire height of outer surface 64 is perpendicular to the base from which boss tower 46 extends.

Figure 3:
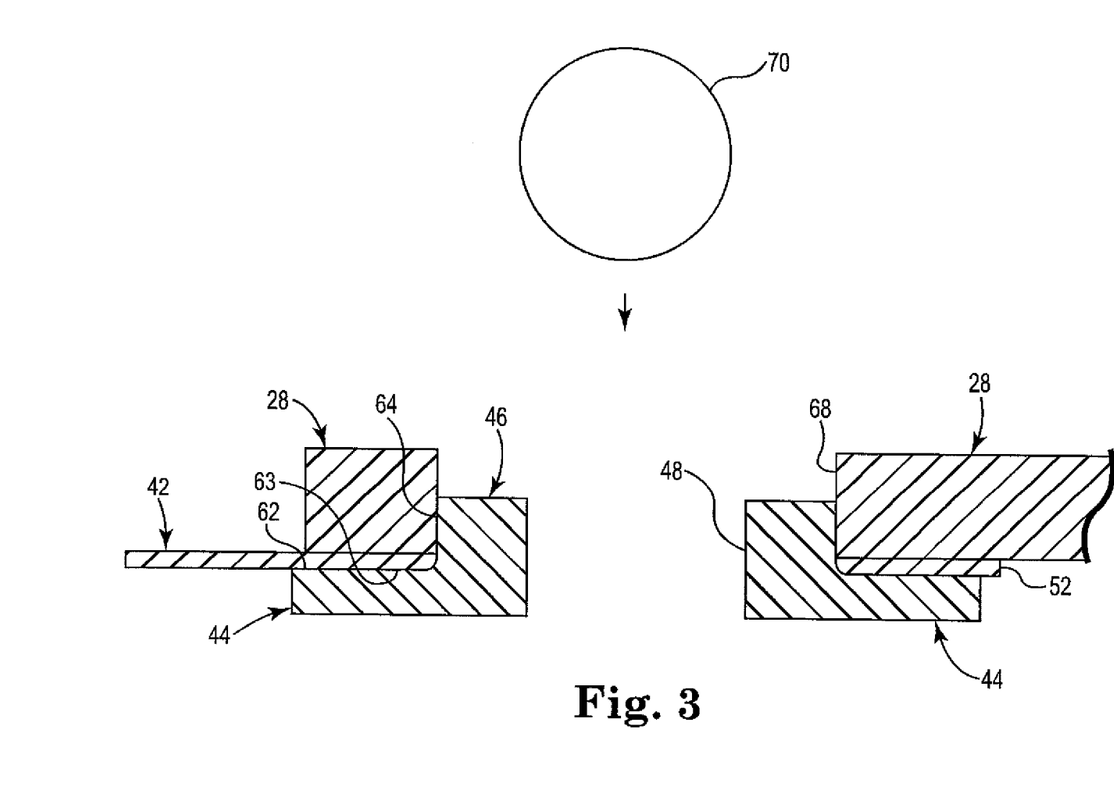
FIG. 3 is a side sectional view of the base plate, load beam and actuator arm prior to swaging.

To swage load beam 42 to actuator arm 28, actuator arm 28, load beam 42 and base plate 44 are aligned with boss tower 46 inserted through load beam aperture 60 and actuator arm aperture 58. As shown in FIG. 3, mounting region 52 is sandwiched between base plate 44 (specifically, a surface 62 of base plate 44) and actuator arm 28 (specifically, a surface 63 of arm 28). Outside surface 64 of boss tower 46 is sized to fit within inner surface 68 of aperture 58 of actuator arm 28. Outside surface 64 is typically adjacent to inner surface 68, although the amount of engagement before swaging may vary.

One or more swaging balls 70 (FIG. 3) are then forced through swage hole 48 to expand boss tower 46 in actuator arm aperture 58. This expansion creates a frictional attachment interface between outside surface 64 of boss tower 46 and interior surface 68 of actuator arm aperture 58. In some embodiments, a frictional attachment may also occur at load beam aperture 60.

When passed through swage hole 48 and apertures 58, 60, swaging ball 70 typically engages the inner surface of swage hole 48 (which is the inner surface of boss tower 46) generating an outwardly directed force against the surface and deforming boss tower 46 so that outer surface 64 frictionally engages inner surface 68 of arm aperture 58. If swage hole 48 and swaging ball 70 are symmetrical, the force will radiate concentrically outward. A subsequent swaging ball 70 of greater diameter can then be used to further expand boss tower 46 and increase the engagement between surface 64 and surface 68.

Figure 4:
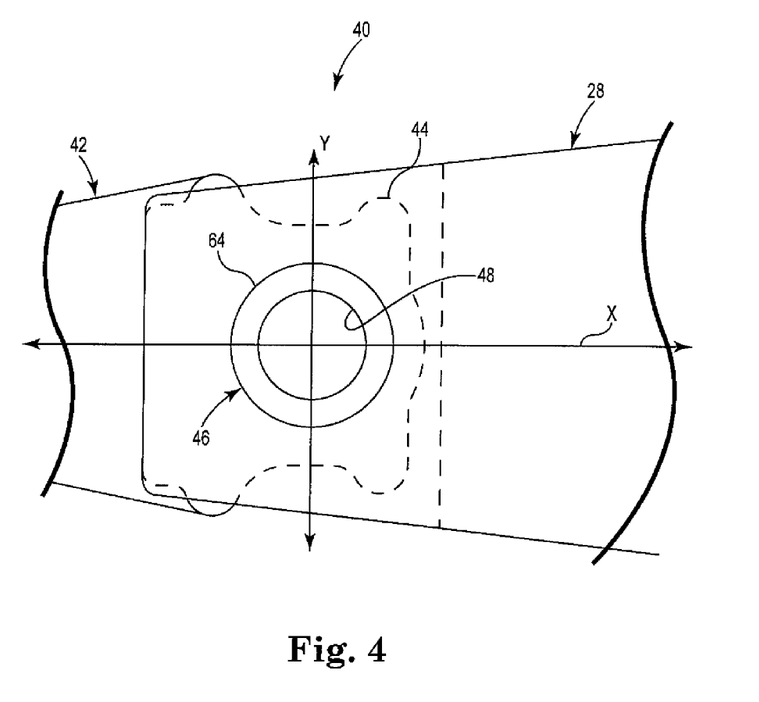
FIG. 4 is a top plan view of the base plate, load beam and actuator arm.

FIG. 4 illustrates an enlarged view of a portion of HSA 40, having actuator arm 28 connected to load beam 42 via boss tower 46 of base plate 44. As illustrated in FIG. 4, assembly 40 has an axis in the longitudinal direction x (referred to as the x-axis) and an axis in the lateral direction y (referred to as the y-axis) intersecting at the center of swage hole 48 and boss tower 46.

In accordance with the present disclosure, the surfaces that form the swaged frictional fit between the boss tower (e.g., boss tower 48) and the actuator arm (e.g., arm 28) are different; that is, prior to swaging, one of the surfaces of the boss tower or of the actuator arm is not circular. For example, the boss tower outer surface (e.g., surface 64) may be non-circular and the inner surface of the arm aperture (e.g., inner surface 68) may be circular. Another example has the boss tower swage hole surface (e.g., hole 48) non-circular and the inner surface of the arm aperture (e.g., inner surface 68) circular. The boss tower outer surface (e.g., surface 64) may have the same or different shape that the swage hole (e.g., swage hole 48); i.e., they both may be non-circular or only one may be non-circular. As another example of different shaped contact surfaces, the inner surface of the arm aperture (e.g., inner surface 68) may be non-circular and the boss tower outer surface (e.g., surface 64) may be circular. The two surface shapes are selected to reduce the interference of the boss tower and the arm aperture, which results in unequal compression force during and after swaging in the pitch direction (i.e., x-direction) and roll direction (i.e., y-direction).

Figure 5:
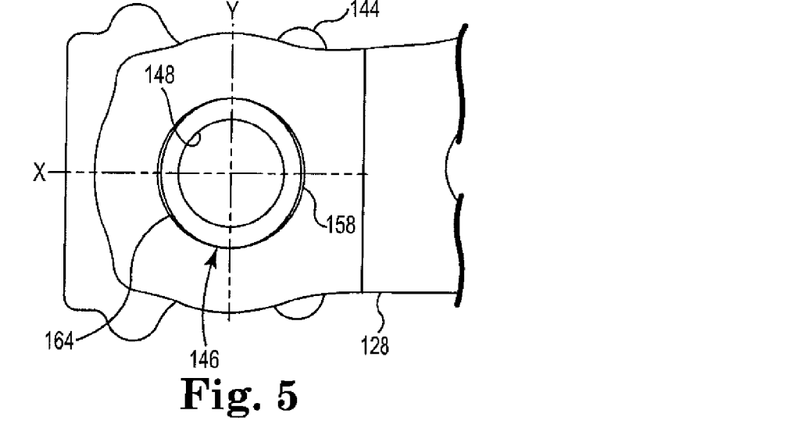
FIG. 5 is a top plan view of a base plate and actuator arm, in accordance with an embodiment of the present disclosure.
Figure 6:
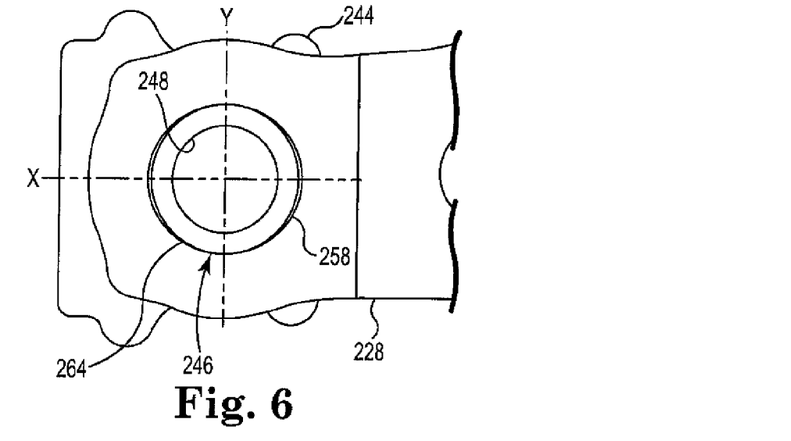
FIG. 6 is a top plan view of a base plate and actuator arm, in accordance with another embodiment of the present disclosure.
Figure 7:
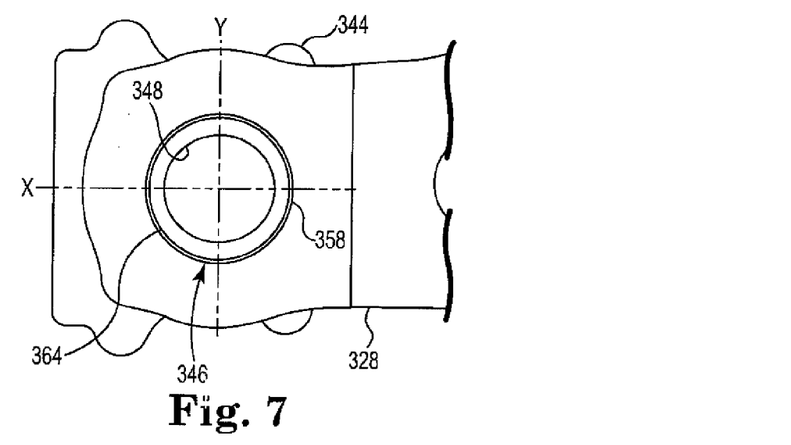
FIG. 7 is a top plan view of a base plate and actuator arm, in accordance with another embodiment of the present disclosure.

FIGS. 5 through 7 illustrate three embodiments of suspension assemblies, or portions thereof, having one of the surfaces that form the swaged frictional fit be non-circular. In each of these embodiments, the non-circular surface is oval, when viewed in the top plan view, and results in reduced compression in the longitudinal direction (x-direction) of the arm when swaged.

In FIG. 5, actuator arm 128 has a circular aperture 158 therein, into which is inserted a boss tower 146 of base plate 144. Boss tower 146 has a circular swage hole 148 but a non-circular outer surface 164. Outer surface 164 has an oval or elliptical shape, with the longer axis of the shape extending laterally in the y-direction. Thus, the wall between swage hole 148 and outer surface 164 has a varying thickness around boss tower 146.

In FIG. 6, actuator arm 228 has a non-circular aperture 258 therein, into which is inserted a boss tower 246 of base plate 244. Boss tower 246 has a circular swage hole 248 and a circular outer surface 264, so that the wall thickness of boss tower 246 is constant around boss tower 246. Aperture 258 has an oval or elliptical shape, with the longer axis of the shape extending longitudinally in the x-direction.

In FIG. 7, actuator arm 328 has a circular aperture 358 therein, into which is inserted a boss tower 346 of base plate 344. Boss tower 346 has a circular outer surface 364 but a non-circular swage hole 348. Swage hole 348 has an oval or elliptical shape, with the longer axis of the shape extending longitudinally in the x-direction. As in FIG. 5, the wall between swage hole 348 and outer surface 364 has a varying thickness.

Non-illustrated, but an alternate suitable configuration would have the boss tower having a non-circular swage hole (e.g., oval or elliptical) and a corresponding non-circular outer surface, so that the wall thickness of the boss tower is constant. The longer axis of the non-circular boss tower extends laterally in the y-direction. Such a boss tower would be used with a circular aperture in the actuator arm.

The non-circular shape in any of the boss tower swage hole, boss tower outer surface or actuator arm aperture is selected to provide an asymmetric engagement of the boss tower and the actuator arm hole, which produces unequal compression force in the pitch direction (longitudinal or x-direction in FIGS. 5-7) and roll direction (lateral or y-direction in FIGS. 5-7). Although a preferred non-circular shape is oval or elliptical, other non-circular shapes, symmetrical and non-symmetrical, regular and irregular can be used. FIGS. 8A-8H, FIG. 9A-9I, and FIGS. 10A and 10B illustrate various alternate non-circular shapes for a boss tower engagement surfaces.

FIGS. 8A-8H illustrate eight different suitable shapes for the outer surface of the boss tower. The following elements are present in each of these figures: actuator arm 444, boss tower 446, swage hole 448 in the boss tower, and outer surface 464 of the boss tower. The elements are distinguished among the various figures by the alphabetic designator subsequent to the numeral; for example, in FIG. 8A each of the numerals designating an element ends in "A", in FIG. 8B each of the numerals designating an element ends in "B", etc., except however, in these figures, swage hole 448 is always the same, thus no alphabetic designator is included. When incorporated into a head stack assembly (e.g., HSA 40 of FIGS. 2 and 4), these illustrated boss tower shapes include shapes that are symmetric in both the longitudinal direction of the arm and in the lateral direction of the arm, symmetric in the longitudinal direction of the arm yet asymmetric in the lateral direction of the arm, symmetric in the lateral direction of the arm yet asymmetric in the longitudinal direction of the arm, and asymmetric in both the longitudinal direction of the arm and in the lateral direction of the arm.

Figures 8A, 8B, 8C:
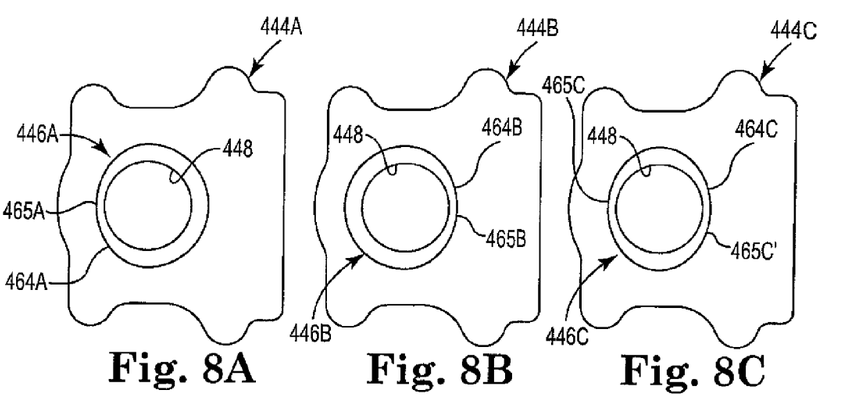
FIGS. 8A-8H are top plan views of various embodiments of base plates in accordance with the present disclosure.

Referring now to the figures, each of FIGS. 8A-8H shows a base plate 444A-H having a boss tower 446A-H with a circular swage hole 448 and a non-circular outer surface 464A-H, resulting in a wall with a non-constant thickness around the boss tower. FIGS. 8A, 8B and 8C illustrate examples of boss tower engagement surfaces that are symmetrical around a longitudinal axis through the swage hole of the base plate and the resulting suspension assembly into which the base plate will be incorporated.

Specifically, FIG. 8A shows a base plate 444A having boss tower 446A with a circular swage hole 448 and an outer surface 464A that is non-circular; in this embodiment, a surface portion 465A has an arcuate contour that provides the non-circular shape to outer surface 464A. Surface portion 465A occupies approximately one-third of the distal-most outer surface 464A and is defined by a radius different than the radius of the other two-thirds of outer surface 464A. Boss tower 446A at surface portion 465A has a lesser thickness than the other two-thirds of boss tower 446A. The thinned portion of boss tower 446A (at surface portion 465A) is symmetrical around the longitudinal direction of base plate 444A and the resulting suspension assembly into which it will be incorporated. Similarly, FIG. 8B shows a base plate 444B that has boss tower 446B with a circular swage hole 448 and an outer surface 464B that is non-circular; in this embodiment, an arcuate surface portion 465B provides the non-circular shape to outer surface 464B. Surface portion 465B occupies approximately one-third of the proximal-most outer surface 464B and is defined by a radius different than the radius of the other two-thirds of outer surface 464B. Boss tower 446B at surface portion 465B has a lesser thickness than the other two-thirds of boss tower 446B. The thinned portion of boss tower 446B (at surface portion 465B) is symmetrical around the longitudinal direction of base plate 444B and the resulting suspension assembly into which it will be incorporated. An accumulation of the two previous examples, FIG. 8C shows a base plate 444C having a boss tower 446C with an outer surface 464C that is non-circular; in this embodiment, two arcuate surface portions 465C and 465C' provide the non-circular shape to outer surface 464C. Surface portion 465C occupies approximately one-third of the distal-most outer surface 464C and surface portion 465C' occupies approximately one-third of the proximal-most outer surface 464C. Both surface portions 465C, 465C' are defined by a radius different than the radius of the other one-third of outer surface 464C. Boss tower 446C at surface portions 465C, 465C' has a lesser thickness than the other one-third of boss tower 446C. The thinned portion of boss tower 446C is symmetrical around the longitudinal direction of base plate 444C and the resulting suspension assembly into which it will be incorporated and is symmetrical around the center of swage hole 448 in a lateral direction of base plate 444C and the resulting suspension assembly into which it will be incorporated. In all of FIGS. 8A, 8B and 8C, when incorporated with an actuator arm aperture and swaged, the result will be reduced compression in the longitudinal or pitch direction due to the non-circular boss tower.

Figure 8D:
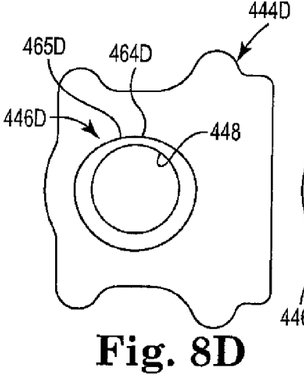
Figures 8E, 8F:
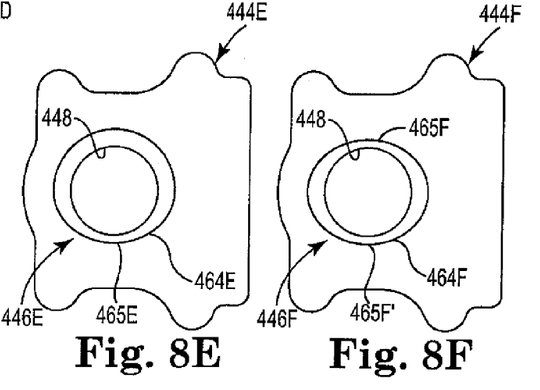

FIGS. 8D, 8E and 8F illustrate examples of boss tower engagement surfaces that are symmetrical around a lateral axis through the swage hole of the base plate and the resulting suspension assembly into which the base plate will be incorporated. Additionally, FIG. 8F illustrates an exemplary base plate that is also symmetrical around the longitudinal axis.

FIG. 8D shows a base plate 444D having a boss tower 446D with a circular swage hole 448 and an outer surface 464D that is non-circular; in this embodiment, a surface portion 465D has an arcuate contour that provides the non-circular shape to outer surface 464D. Surface portion 465D occupies approximately one-third of outer surface 464D and is defined by a radius different than the radius of the other two-thirds of outer surface 464D. Boss tower 446D at surface portion 465D has a lesser thickness than the other two-thirds of boss tower 446D. The thinned portion of boss tower 446D (at surface portion 465D) is symmetrical around a lateral axis through the center of swage hole 448. FIG. 8E illustrates a mirror image of FIG. 8D, with a base plate 444E having boss tower 446E with a circular swage hole 448 and an outer surface 464E that is non-circular; in this embodiment, an arcuate surface portion 465E occupies approximately one-third of boss tower 446E and creates a lesser thickness than the other two-thirds of boss tower 446E. The thinned portion of boss tower 446E is symmetrical around the lateral axis through the center of swage hole 448. FIG. 8F is an accumulation of the two previous examples, showing a base plate 444F having boss tower 446F with a circular swage hole 448 and an outer surface 464F that is non-circular; in this embodiment, two arcuate surface portions 465F and 465F' provide the non-circular shape to outer surface 464F. Surface portion 465F occupies approximately one-third of outer surface 464F and surface portion 465F' occupies another approximately one-third of outer surface 464F. Both surface portions 465F, 465F' are defined by a radius different than the radius of the other one-third of outer surface 464F. Boss tower 446F at surface portions 465F, 465F' has a lesser thickness than the other one-third of boss tower 446F. The thinned portion of boss tower 446F is symmetrical around the longitudinal direction and the resulting suspension assembly into which it will be incorporated and is symmetrical around the center of swage hole 448 in a lateral direction. In all of FIGS. 8D, 8E and 8F, when incorporated with an actuator arm aperture and swaged, the result will be reduced compression in the lateral or roll direction due to the non-circular boss tower.

Figures 8G, 8H:
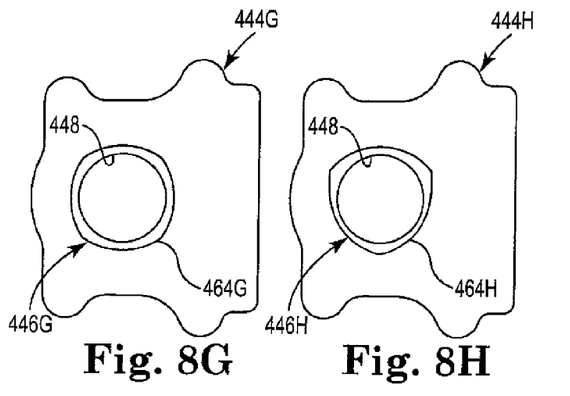

FIG. 8G is an accumulation of both FIGS. 8C and 8F, both of which are symmetrical in the lateral direction and the longitudinal direction. Specifically, FIG. 8G shows a base plate 444G having a boss tower 446G with a circular swage hole 448 and an outer surface 464G that is non-circular; in this embodiment, there is no portion of outer surface 464G that is circular, but rather, outer surface 464G is formed from four arcuate segments. Boss tower 446G is symmetrical around the longitudinal direction and the resulting suspension assembly into which it will be incorporated and is symmetrical around the center of swage hole 448 in a lateral direction.

FIG. 8H is similar to FIG. 8G in that base plate 444H has a boss tower 446H having a circular swage hole 448 and an outer surface 464H where no portion is circular but rather, outer surface 464H is formed from three arcuate segments. As illustrated, boss tower 446H is symmetrical around a lateral axis through the center of swage hole 448. The three arcuate segments forming outer surface 464H could alternately be configured to have the boss tower symmetrical around the longitudinal axis or asymmetrical around both the lateral and longitudinal axes.

Figure 9A:
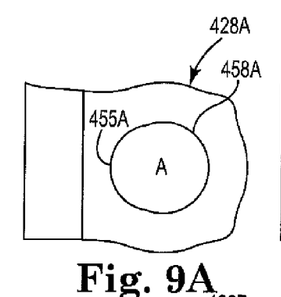
FIGS. 9A-9I are top plan views of various embodiments of actuator arms in accordance with the present disclosure.
Figure 9B:
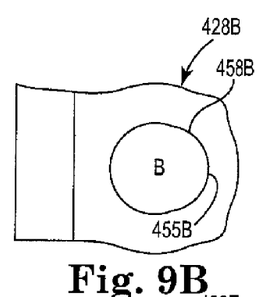
Figure 9C:
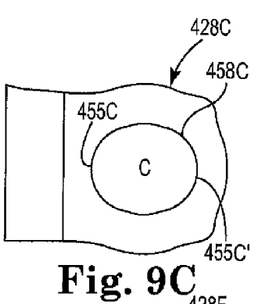
Figure 9D:
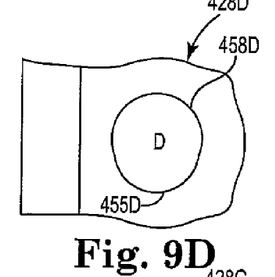
Figure 9E:
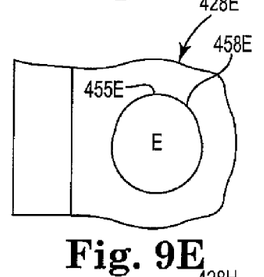
Figure 9F:
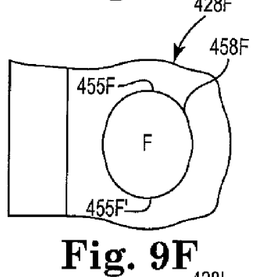
Figure 9G:
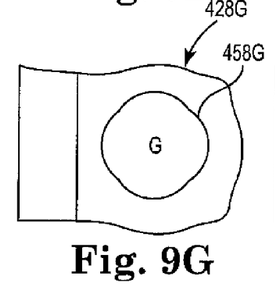

The previous examples (FIGS. 8A-8H) have illustrated embodiments having a non-circular boss tower exterior surface. As indicated above, the non-circular shape may be in any of the engagement surfaces, (i.e., the boss tower outer surface, the boss tower swage hole, or the actuator arm aperture). The following examples, FIGS. 9A-9I, each shows an actuator arm 428A-I having a non-circular aperture 458A-I. FIGS. 9A and 9B illustrate examples of boss tower engagement surfaces (specifically, actuator arm apertures) that are symmetrical around a longitudinal axis through the actuator arm and the resulting suspension assembly into which the arm will be incorporated. FIGS. 9D and 9E illustrate examples of boss tower engagement surfaces (specifically, actuator arm apertures) that are symmetrical around a lateral axis through the actuator arm aperture. FIGS. 9C, 9F and 9G illustrate examples of boss tower engagement surfaces (specifically, actuator arm apertures) that are symmetrical both around a longitudinal axis through the actuator arm and a lateral axis through the actuator arm aperture.

Specifically, FIG. 9A shows an actuator arm 428A having a non-circular aperture 458A; in this embodiment, a portion 455A of aperture 458A has an arcuate contour that provides the non-circular shape to aperture 458A. Portion 455A occupies approximately one-third of the proximal side of aperture 458A and is defined by a radius different than the radius of the other two-thirds of aperture 458A. Aperture 458A is symmetrical around the longitudinal direction of actuator arm 428A and the resulting suspension assembly into which it will be incorporated. Similarly, FIG. 9B shows an actuator arm 428B having a non-circular aperture 458B; in this embodiment, a portion 455B of aperture 458B has an arcuate contour that provides the non-circular shape to aperture 458B. Portion 455B occupies approximately one-third of the distal side of aperture 458B and is defined by a radius different than the radius of the other two-thirds of aperture 458B. Aperture 458B is symmetrical around the longitudinal direction of actuator arm 428B and the resulting suspension assembly into which it will be incorporated. An accumulation of the two previous examples, FIG. 9C shows an actuator arm 428C having a non-circular aperture 458C; in this embodiment, two arcuate surface portions 455C and 455C' provide the non-circular shape to aperture 458C. Portion 455C occupies approximately one-third of the proximal side of aperture 458C and portion 455C' occupies approximately one-third of the distal side of aperture 458C. Both portions 455C, 455C' are defined by a radius different than the radius of the other one-third of aperture 458C. Aperture 458C is symmetrical around the longitudinal direction of actuator arm 428C and the resulting suspension assembly into which it will be incorporated and is symmetrical around the center of aperture 458C in a lateral direction.

Turning to FIG. 9D, FIG. 9D shows an actuator arm 428D having a non-circular aperture 458D; in this embodiment, a portion 455D of aperture 458D has an arcuate contour that provides the non-circular shape to aperture 458D. Portion 455D occupies approximately one-third of aperture 458D and is defined by a radius different than the radius of the other two-thirds of aperture 458D. Aperture 458D is symmetrical around a lateral axis taken through the center of aperture 458D. Similarly, FIG. 9E shows an actuator arm 428E having a non-circular aperture 458E; in this embodiment, a portion 455E of aperture 458E has an arcuate contour that provides the non-circular shape to aperture 458E. Portion 455E occupies approximately one-third of aperture 458E and is defined by a radius different than the radius of the other two-thirds of aperture 458E. Aperture 458E is symmetrical around a lateral axis taken through the center of aperture 458E. An accumulation of the two previous examples, FIG. 9F shows an actuator arm 428F having a non-circular aperture 458F; in this embodiment, two arcuate surface portions 455F and 455F' provide the non-circular shape to aperture 458F. Portion 455F occupies approximately one-third of a first side of aperture 458F and portion 455F' occupies approximately one-third of a second side of aperture 458F. Both portions 455F, 455F' are defined by a radius different than the radius of the other one-third of aperture 458F. Aperture 458F is symmetrical around the longitudinal direction of actuator arm 428F and the resulting suspension assembly into which it will be incorporated and is also symmetrical around the center of aperture 458F in a lateral direction.

FIG. 9G is an accumulation of both FIGS. 9C and 9F, both of which are symmetrical in the lateral direction and the longitudinal direction. Specifically, FIG. 9G shows an actuator arm 428G having a non-circular aperture 458G; in this embodiment there is no portion of aperture 458G that is circular, but rather, aperture 458G is formed from four arcuate segments. Aperture 458G is symmetrical around the longitudinal direction and the resulting suspension assembly into which it will be incorporated and is symmetrical around the center of aperture 458G in a lateral direction.

Figure 9H:
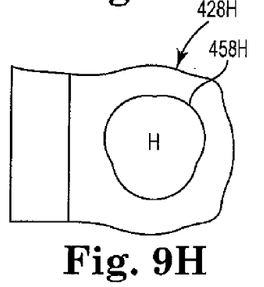

FIG. 9H is similar to FIG. 9G in that aperture 458H of arm 428H has no portion that is circular but rather is formed from three arcuate segments. As illustrated, aperture 458H is not symmetrical around either a longitudinal axis nor a lateral axis. The three arcuate segments forming aperture 458H could alternately be configured to have the boss tower symmetrical around the longitudinal axis, symmetrical around the lateral axis, or symmetrical around both.

Figure 9I:
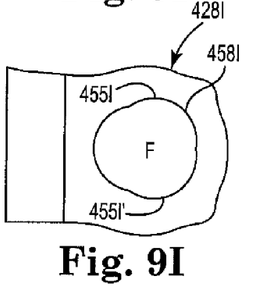

FIG. 9I shows another example of a boss tower engagement surface (specifically, an actuator arm aperture) that is symmetrical around a longitudinal axis through the actuator arm and the resulting suspension assembly into which the arm will be incorporated. In FIG. 9I, actuator arm 428I has a non-circular aperture 458I that has two arcuate contour portions 455I, 455I' that provide the non-circular shape to aperture 458I.

The previous examples (FIGS. 9A-9I) have illustrated embodiments having non-circular actuator arm apertures. As indicated above, the present invention includes a non-circular shape in any of the head stack assembly engagement surfaces, (i.e., the boss tower outer surface, the boss tower swage hole, or the actuator arm aperture). The following examples, FIGS. 10A and 10B, show non-circular swage holes.

Figure 10A:
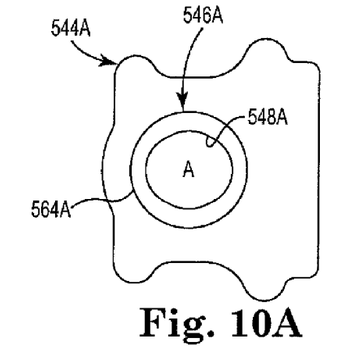
FIGS. 10A-10B are top plan views of various embodiments of base plates in accordance with the present disclosure.
Figure 10B:
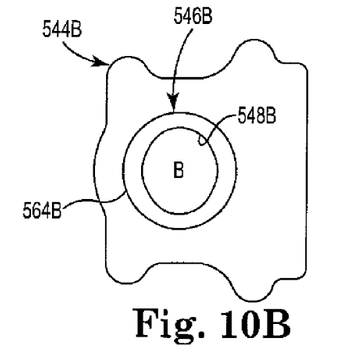

FIG. 10A shows a base plate 544A having boss tower 546A with a non-circular swage hole 548A and a circular outer surface 564A; in this embodiment, swage hole 548A has an elongated shape (e.g., oval or elliptical) with the longer dimension in the longitudinal direction. Boss tower 546A has an inconsistent thickness, with a lesser thickness in the longitudinal direction. When incorporated with a circular actuator arm aperture, the result is increased compression in the lateral, or roll, direction. FIG. 10B shows a base plate 544B having boss tower 546B with a non-circular swage hole 548B and a circular outer surface 564B; in this embodiment, swage hole 548B has an elongated shape (e.g., oval or elliptical) with the longer dimension in the lateral direction. Boss tower 546B has an inconsistent thickness, with a lesser thickness in the lateral direction. When incorporated with a circular actuator arm aperture, the result is increased compression in the longitudinal, or pitch, direction.

Figure 11A:
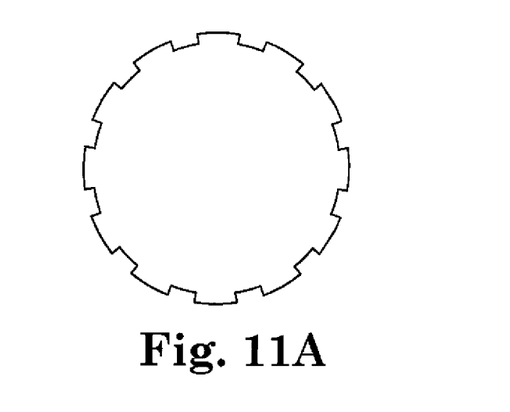
FIGS. 11A-11C are examples of "circular-in-nature" shapes.
Figure 11B:
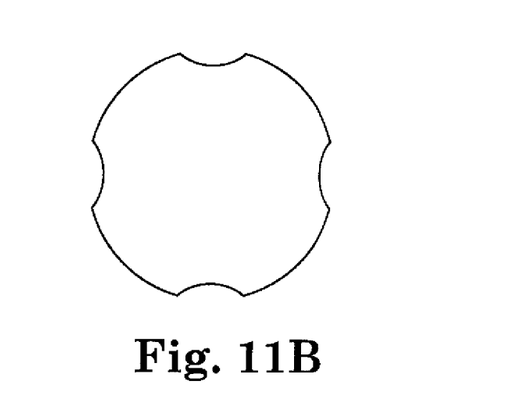
Figure 11C:
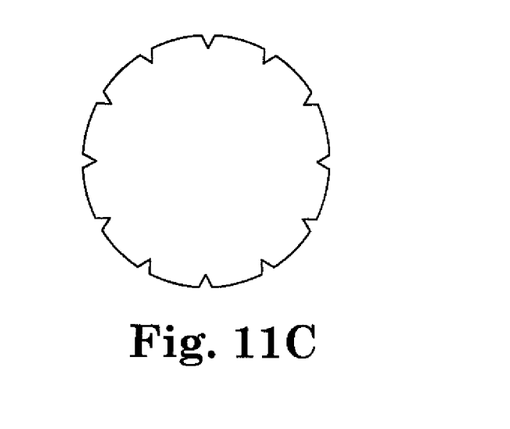

As indicated numerous times above, at least one head stack assembly engagement surface is non-circular, and various non-circular shapes for a head stack assembly engagement surface have been provided above. The shapes may be regular, irregular, symmetrical or asymmetrical. Preferably, the shape is defined by arcuate segments, although in some embodiments straight lines and/or sharp angles may be present (for example, although not preferred, the non-circular shape may be a square or rectangle or the like). Shapes that are "circular-in-nature" are considered "circular" for purposes of this disclosure, and are not considered non-circular. Examples of shapes that are "circular-in-nature", albeit not truly circular, are provided in FIGS. 11A-11C. Although each of these shapes has secondary features that remove the shape from being truly circular, the primary shape is circular, and thus "circular-in-nature".

For an oval or elliptical shape, a range for the ratio of the long axis to the short axis of about 1.001:1 to 1.1:1 is preferred; in some embodiments a ratio range of about 1.0047:1 to 1.0429:1 is preferred.

The non-circular shape or shape that is non-circular in nature in any of the head stack assembly engagement surfaces (i.e., the boss tower outer surface, the boss tower swage hole, or the actuator arm aperture) provides an asymmetric engagement of the boss tower and the actuator arm hole, which produces unequal compression force in the pitch direction (longitudinal direction) and roll direction (lateral direction). In some embodiments, it is preferred that the compression force is higher in the roll direction than the pitch direction.

The discussion above and the various illustrations are directed to non-circular shapes for head stack assembly engagement surfaces prior to the swaging process. After swaging, that is, after passing a swage ball 70 through boss tower 46 and swage hole 48 (as illustrated and described in reference to FIG. 3), the engagement surfaces distort due to the compression of the surfaces caused by swage ball 70 against boss tower 46 and inner surface 68 of aperture 58 of actuator arm 28. In the swaged assembly, although it may not be possible to determine which particular surface was non-circular (i.e., the boss tower outer surface, the boss tower swage hole, or the actuator arm aperture), the swaged engagement is less compressed proximate the region where the non-circular portion existed.

It is understood that numerous variations of head stack assembly engagement surfaces and methods of making a head stack assembly could be made while maintaining the overall inventive design and remaining within the scope of the invention. Numerous alternate design or element features have been mentioned above.

Thus, embodiments of the NON-CIRCULAR FEATURE FOR BOSS TOWER ENGAGEMENT are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A head stack assembly comprising:
a longitudinal direction and a lateral direction;
an actuator arm having an aperture therein;
a head suspension assembly comprising a load beam having a mounting region with an aperture therein; and
a base plate adapted to attach the head suspension assembly to the actuator arm, the base plate comprising a boss tower having an outside surface and a swaging hole,
wherein the actuator arm aperture is oval or elliptical with a longitudinal axis extending in the longitudinal direction, or wherein the boss tower outside surface is oval or elliptical with a longitudinal axis extending in the lateral direction.

2. The head stack assembly of claim 1 wherein one of the actuator arm aperture or the boss tower outside surface comprises a ratio of a long axis to a short axis of 1.0047:1 to 1.0429:1.

3. The head stack assembly of claim 1 wherein at least one of the actuator arm aperture, the boss tower outside surface or the swaging hole is symmetrical around the longitudinal axis.

4. The head stack assembly of claim 1 wherein at least one of the actuator arm aperture, the boss tower outside surface or the swaging hole is symmetrical around the lateral axis.

5. The head stack assembly of claim 1 wherein at least one of the actuator arm aperture, the boss tower outside surface or the swaging hole is symmetrical around both the longitudinal axis and the lateral axis.

6. A head stack assembly having a roll direction and a pitch direction, the assembly comprising:
an actuator arm having an aperture therein;
a head suspension assembly comprising a load beam having a mounting region with an aperture therein; and
a base plate adapted to attach the head suspension assembly to the actuator arm, the base plate comprising a boss tower having an outside surface and a swaging hole;
wherein one of the actuator arm aperture, the boss tower outside surface, and the swaging hole is oval or elliptical with a long axis extending in the pitch direction;
the actuator arm, load beam and base plate aligned and swaged with the boss tower present through the actuator arm aperture and the mounting region aperture, with increased compression between the boss tower and the actuator arm aperture in the roll direction than in the pitch direction.

7. The head stack assembly of claim 6, wherein one of the actuator arm aperture, the boss tower outside surface, or the swaging hole has a ratio of a long axis to a short axis of 1.0047:1 to 1.0429:1.

8. A method of swaging a head suspension to an actuator arm in a disk drive comprising the steps of:
providing a head suspension assembly comprising a load beam having a mounting region with an aperture;
providing an actuator arm having an aperture;
providing a base plate comprising a boss tower having an outer surface and a swaging hole with an inner surface, wherein the actuator arm aperture is oval or elliptical with a longitudinal axis extending in a longitudinal direction of the actuator arm, or the boss tower outer surface is oval or elliptical with a longitudinal axis extending in a lateral direction of the actuator arm;
positioning the aperture in the mounting region of the head suspension assembly concentric with the aperture in the actuator arm;

inserting the boss tower into the apertures of the mounting region and the actuator arm so that the mounting region is positioned between the actuator arm and the base plate; and inserting a swaging ball into the swaging hole.

\* \* \* \* \*

UNITED STATES PATENT AND TRADEMARK OFFICE
CERTIFICATE OF CORRECTION

| | |
|---|---|
| PATENT NO. | : 9,013,833 B2 |
| APPLICATION NO. | : 13/796767 |
| DATED | : April 21, 2015 |
| INVENTOR(S) | : Prapan Aparimarn, Surawut Onsakorn and Joomponladej Bamrungwongtaree |

It is certified that error appears in the above-identified patent and that said Letters Patent is hereby corrected as shown below:

Title page (72) Inventors:   "Surawut Onasakorn" should be -- Surawut Onsakorn --

Signed and Sealed this
Sixth Day of October, 2015

Michelle K. Lee
*Director of the United States Patent and Trademark Office*